Feb. 9, 1965 A. B. CLARK, JR 3,168,879
PALLET STRUCTURE AND METHOD OF PALLETIZING
Filed Sept. 3, 1963 2 Sheets-Sheet 2
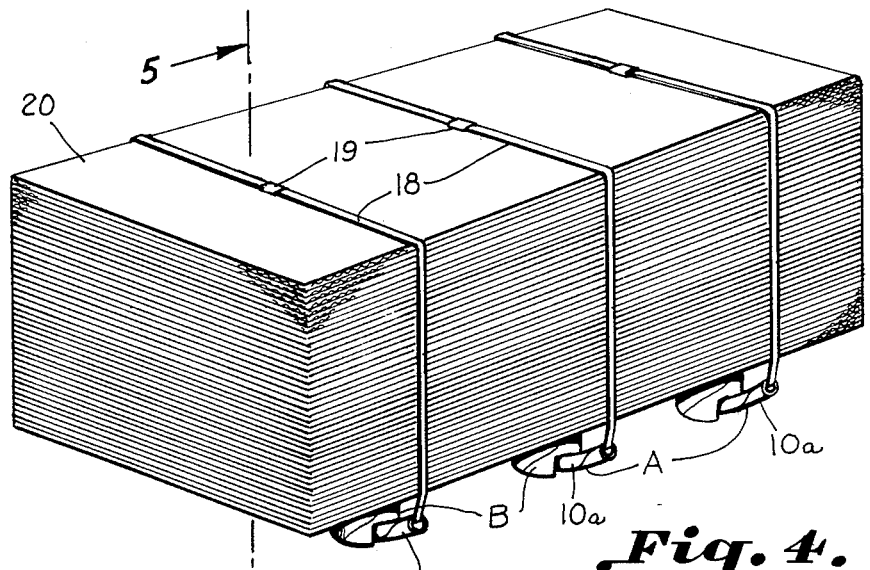
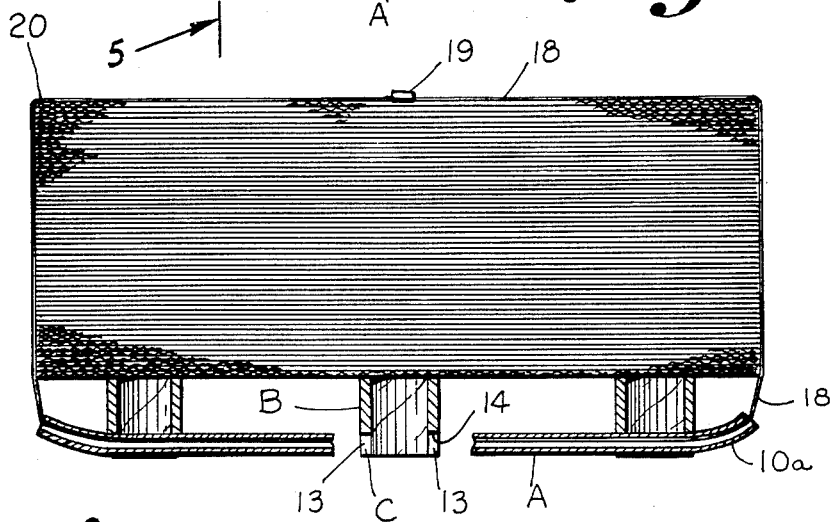
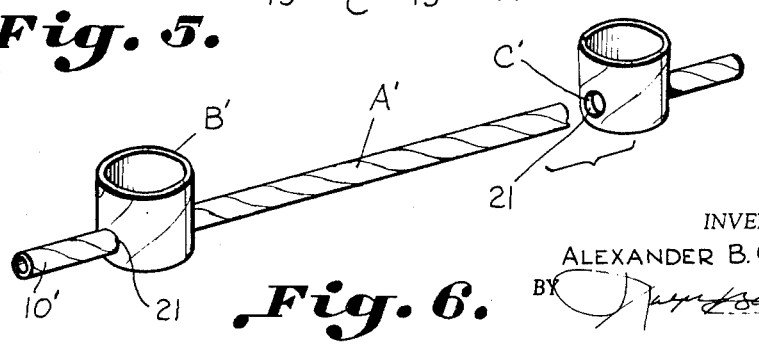
INVENTOR.
ALEXANDER B. CLARK, JR.
BY
ATTORNEY

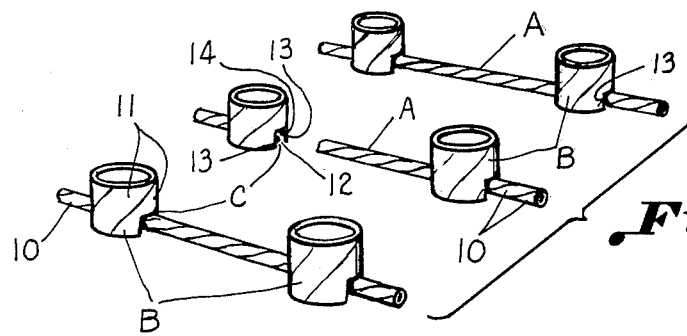
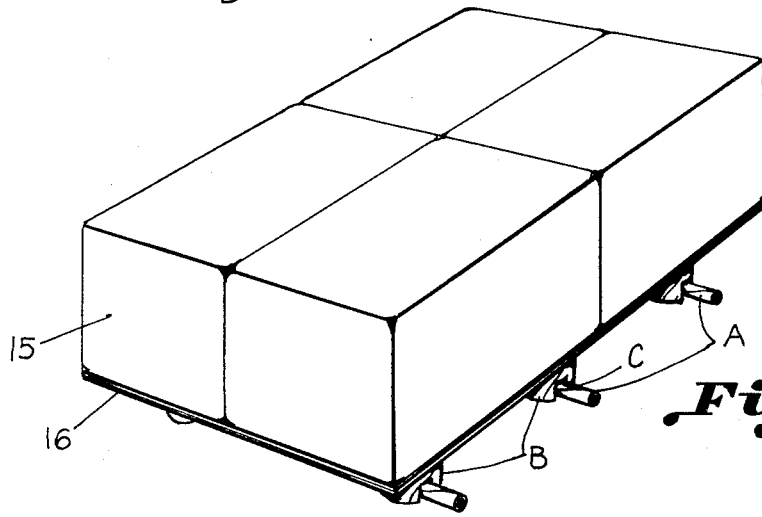
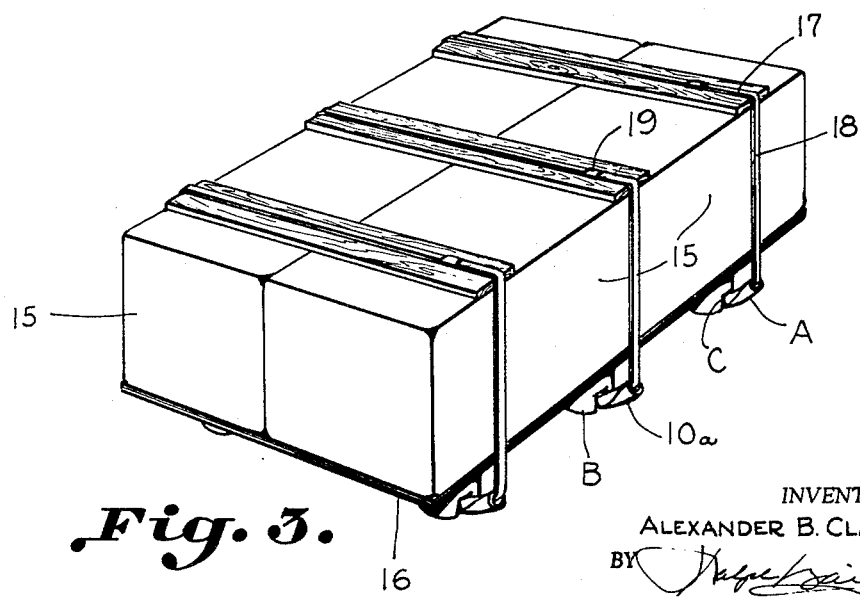

United States Patent Office 3,168,879
Patented Feb. 9, 1965

3,168,879
PALLET STRUCTURE AND METHOD
OF PALLETIZING
Alexander B. Clark, Jr., Box 2012, Hendersonville, N.C.
Filed Sept. 3, 1963, Ser. No. 306,107
3 Claims. (Cl. 108—55)

This invention relates to a pallet structure employing paper cores and the like, assembled in individual groups, for assembly into a package for handling and shipping, and to the method of palletizing.

For assembling packages suitable for handling and shipping wooden pallets are often used. Such pallets involve the use of glue or nails and the relatively expensive wood of which the pallets are constructed is usually not suitable for reuse, and must be discarded. The eliminating of such used pallets is in itself a major problem. Such pallets include a platform which must be supported by wood reinforcing members running across a base dimension of the platform permitting entry by a fork lift truck across one dimension in two directions only. Shipping and storage of such bulky articles present additional problems. No positive guides are provided for the steel strapping so that the packaged articles may be cut and chafed. Pallets using paper cores and cardboard, such as used by the cardboard industry, result in a wasteful expenditure of cardboard and excessive damage to the stacked cardboard through transfer marks, cutting and chafing.

Accordingly, it is an important object of the invention to provide an improved expandable pallet structure and method for use in assembling packages for handling and shipping.

Another object of the invention is to provide pallets constructed so as to occupy a minimum of storage space and which may be easily disposed of after use.

Another important object of the invention is to provide a pallet capable of assembly into a package affording entry for a fork lift truck across both dimensions of the base.

Another important object of the invention is to provide guides for the metal straps which will avoid cutting and chafing of the articles stacked thereon.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIGURE 1 is a perspective view illustrating a pallet constructed in accordance with the present invention and the method of assembling same, FIGURE 2 is a perspective view illustrating an intermediate step in the method of palletizing in accordance with the present invention, FIGURE 3 is a perspective view illustrating a package constructed in accordance with the present invention, FIGURE 4 is a perspective view illustrating a different type package but constructed in accordance with the present invention, FIGURE 5 is a longitudinal sectional elevation taken on the line 5—5 in FIGURE 4, and FIGURE 6 is a perspective view illustrating a modified form of the invention.

The drawings illustrate a pallet assembly for shipping articles attached thereon by strapping and the like. A plurality of relatively small spaced tubular elements A, constructed of roll paper stock, extend across a base dimension of the articles sought to be attached and serve as guide means for straps. A plurality of spaced vertical relatively large cylindrical hollow members B, constructed of roll paper stock, are received by a pressed fit upon the relatively small tubular elements thus forming individual groups of cylindrical members joined by the guide means for the straps. The relatively large cylindrical members have cut out portions C therein to accommodate the relatively small tubular elements, so that the strapping may be received by the relatively small tubular elements and passed upwardly over the articles forming a package. Thus, the spacing of the cylindrical members and guide means permits entry of the forks of a fork lift truck therebetween and under the articles from any direction. Protective means may be placed above the articles and fastened in place by the straps. The method of palletizing includes, spacing a plurality of the relatively small tubular elements A across a base dimension of the articles. A plurality of relatively large vertical cylindrical hollow members B, into which apertures have been placed for reception of the relatively small tubular elements, are spaced upon said relatively small tubular elements. The articles are placed upon the large cylindrical members and strap fastening means passed through the relatively small tubular elements, and fastened tightly about the articles.

The tubular elements A, illustrated in FIGURE 1, are preferably in the form of paper tubes and are formed from spirally wound paper stock 10. Machines may be provided in the plant of the user for making the paper tubes from the stock in the plant, rather than incur the expense of transporting and storing the relatively bulky paper tubes. The cylindrical hollow members B are also preferably constructed of spirally wound paper stock 11, and such may also be manufactured at the plant of the user by forming the necessary paper tubes and then cutting off the cores to desired lengths.

The cut out portions C may be placed therein by cutting them out through the use of a dado saw and the like. The cut out portion C are preferably formed by cutting out a portion adjacent the bottom edge of the core B so as to be open at the bottom for reception of the tubes A. The cores B are preferably received by a tight pressed fit with the tubes A thus forming individual groups of cylindrical members. The open bottom portion of the cut out portions is designated at 12, and the side surfaces are designated at 13, while the top is designated at 14.

In FIGURE 2, packages 15, which may be of the type used in packaging Fiberglas yarn wherein the yarn is contained within cardboard boxes, are illustrated as being placed upon a planar element, illustrated as being plywood sheet 16, which is placed across the cores B. Protective means, illustrated as wooden strips 17, may be placed on the articles 15 and the straps passed thereover. If it is desired that the packages or that the pallet assemblies be stacked, it is desirable that wooden strips 17 be placed beneath the straps 18 which are bound thereabout and fastened with the usual strap fastening means 19. It will be noted in FIGURE 3 that the tubes are bent upwardly as at 10a to avoid damaging the cartons 15.

FIGURES 4 and 5 illustrate another type of pallet assembly in which cardboard sheets 20 are packaged. A stack of the carboard sheets are simply placed across the cores B, and the necessary strapping 18 wound thereabout and fastened by the usual fastening means 19. In this case, three rows of tubing A and cores B have been employed. It will be noted that the tubes A are bent upwardly somewhat as at 10a so as to accommodate the strap 18 to the package so as to avoid damage to the stack of cardboard sheets 20.

FIGURE 6 illustrates a modified form of the invention in which like reference characters are used to designate like parts with prime notations added. It will be noted that a round hole 21 is placed within an intermediate portion of the cores B' so as to accommodate the tubes A'.

It is evident that the spacing of the cylindrical members and tubular members permit the entry of the forks of a fork lift truck therebetween. The packaged articles are sufficiently elevated by the cylindrical members to permit the passage of the forks therebeneath. The tubular members serve to join the cylindrical members into groups of spaced member which are in turn spaced beneath the packaged articles and as guide means for positioning the strap fastening means. The tubular members also protect the package articles from damage which might be caused by the straps during handling and shipping. Since the tubes and cylindrical elements are preferably contructed from roll paper stock, they are light, inexpensive and readily disposed of after use.

While a preferred embodiment of the invention has been described using specific terms, such description is for illustrative purposes only, and it is to be understood that changes and variations may be made without departing from the spirit or scope of the following claims.

What is claimed is:

1. A pallet assembly for shipping articles attached thereon by strapping including, a plurality of relatively small spaced tubular elements extending across a base dimension of the articles sought to be attached, and a plurality of spaced vertical relatively large hollow cylindrical members received upon the relatively small tubular elements, said relatively large cylindrical members having cut out portions therein to accommodate the relatively small tubular elements, whereby the strapping may be received by the relatively small tubular elements and passed upwardly around the large cylindrical members and over the articles forming a package.

2. The structure set forth in claim 1 wherein the cut out portions are in the lower edge of the cylindrical hollow members and have a pressed fit upon the tubular elements.

3. The structure set forth in claim 1 in which the cut out portions are in an intermediate portion of the cylindrical hollow members and have a pressed fit upon the tubular elements.

References Cited by the Examiner
UNITED STATES PATENTS

| | | | |
|---|---|---|---|
| 2,211,962 | 8/40 | Morris | 108—44 X |
| 2,444,184 | 6/48 | Cahners | 108—58 |
| 2,614,689 | 10/52 | Miller | 108—56 X |
| 2,626,456 | 1/53 | Harrison | 108—55 X |
| 2,630,214 | 3/53 | Reed | 206—46 |
| 2,696,235 | 12/54 | Toffolon | 108—55 X |
| 2,738,092 | 3/56 | Ladd | 108—56 X |
| 3,104,085 | 9/63 | Skiadany | 108—51 |

FRANK B. SHERRY, *Primary Examiner.*